(12) United States Patent
Zähe

(10) Patent No.: US 10,969,800 B2
(45) Date of Patent: Apr. 6, 2021

(54) PROPORTIONAL FLOW CONTROL VALVE WITH COUNTERBALANCE VALVE INTEGRATED THEREWITH

(71) Applicant: Sun Hydraulics, LLC, Sarasota, FL (US)

(72) Inventor: Bernd Zähe, Sarasota, FL (US)

(73) Assignee: Sun Hydraulics, LLC, Sarasota, FL (US)

( * ) Notice: Subject to any disclaimer, the term of this patent is extended or adjusted under 35 U.S.C. 154(b) by 162 days.

(21) Appl. No.: 16/442,871

(22) Filed: Jun. 17, 2019

(65) Prior Publication Data

US 2020/0393855 A1 Dec. 17, 2020

(51) Int. Cl.
| G05D 7/06 | (2006.01) |
| F16K 31/06 | (2006.01) |
| F16K 31/122 | (2006.01) |
| F16K 11/07 | (2006.01) |
| F15B 13/042 | (2006.01) |

(52) U.S. Cl.
CPC ............ *G05D 7/0635* (2013.01); *F16K 11/07* (2013.01); *F16K 31/0613* (2013.01); *F16K 31/1221* (2013.01); *F15B 13/0426* (2013.01)

(58) Field of Classification Search
CPC ............. F16K 31/0613; F16K 31/1221; F16K 31/1245; F16K 31/406; F16K 11/07; F16K 17/168; Y10T 137/77766; Y10T 137/7769; Y10T 137/777; Y10T 137/86614; F15B 13/0426; F15B 13/024; F15B 13/025; F15B 13/0431; F15B 2211/5157; F15B 2211/526; F15B 2211/528
USPC ..................... 137/491, 492, 492.5
See application file for complete search history.

(56) References Cited

U.S. PATENT DOCUMENTS

| 6,527,010 B1 * | 3/2003 | Watson ................. E21B 34/04 |
| | | 137/625.63 |
| 9,850,919 B2 * | 12/2017 | Zaehe ..................... G05D 16/10 |
| 10,437,269 B1 * | 10/2019 | Zahe ...................... F15B 13/024 |
| 10,794,510 B1 * | 10/2020 | Pena ....................... F16K 31/408 |
| 2006/0201554 A1 * | 9/2006 | Prinsen ............... F16K 17/0433 |
| | | 137/491 |
| 2016/0091101 A1 * | 3/2016 | Neubauer ............. F16K 31/406 |
| | | 137/625.18 |

* cited by examiner

*Primary Examiner* — Kelsey E Cary
(74) *Attorney, Agent, or Firm* — McDonnell Boehnen Hulbert & Berghoff LLP

(57) ABSTRACT

An example valve includes: a first port configured to be fluidly coupled to an actuator; a second port configured to be fluidly coupled to a reservoir; a third port configured to provide an output pilot fluid signal and receive an input pilot fluid signal; a fourth port configured to be fluidly coupled to a source of fluid; a pilot poppet configured to be subjected to a first fluid force of fluid received at the first port; a pilot piston interfacing with the pilot poppet and configured to be subjected to a second fluid force of the input pilot fluid signal; a solenoid actuator sleeve that is axially movable between an unactuated state and an actuated state; and at least one setting spring configured to apply a biasing force on the pilot piston and the pilot poppet.

20 Claims, 6 Drawing Sheets

PROPORTIONAL FLOW CONTROL VALVE WITH COUNTERBALANCE VALVE INTEGRATED THEREWITH

BACKGROUND

A meter-in valve can be configured to control fluid flow to an actuator in a hydraulic system in such a manner that there is a restriction in the amount of fluid flowing to the actuator. The meter-in valve can be actuated electrically, mechanically, pneumatically, hydraulically, or manually.

Counterbalance valves are hydraulic valves configured to hold and control negative or gravitational loads. They may be configured to operate, for example, in applications that involve the control of suspended loads, such as mechanical joints, lifting applications, extensible movable bridge, winches, etc.

In some applications, the counterbalance valve, which may also be referred to as an overcenter valve, can be used as a safety device that prevents an actuator from moving if a failure occurs (e.g., a hose burst) or could be used as a load-holding valve (e.g., on a boom cylinder of a mobile machinery). The counterbalance valve allows cavitation-free load lowering, preventing the actuator from overrunning when pulled by the load (gravitational load).

An actuator that has two chambers can have one or more meter-in valves to control fluid flow to the chambers and counterbalance valves that control fluid flow out of the chambers. Additional valves (e.g., check valves) are typically added to perform additional functionalities in a hydraulic system.

Such a hydraulic system can involve many hydraulic connections between the different valves. Also, the valves can be placed in a manifold that includes complex fluid passages and ports to connect the various valves in the hydraulic system. It may thus be desirable to have a valve that reduces complexity and cost of the hydraulic system.

SUMMARY

The present disclosure describes implementations that relate to a proportional flow control valve with counterbalance valve integrated therewith.

In a first example implementation, the present disclosure describes a valve. The valve includes: (i) a plurality of ports comprising: (a) a first port configured to be fluidly coupled to a hydraulic actuator, (b) a second port configured to be fluidly coupled to a reservoir, (c) a third port configured to provide an output pilot fluid signal and receive an input pilot fluid signal, and (d) a fourth port configured to be fluidly coupled to a source of fluid; (ii) a pilot poppet configured to be subjected to a first fluid force of fluid received at the first port acting on the pilot poppet in a proximal direction; (iii) a pilot piston interfacing with the pilot poppet and configured to be subjected to a second fluid force of the input pilot fluid signal acting on the pilot piston in the proximal direction; (iv) a solenoid actuator sleeve that is axially movable between an unactuated state and an actuated state; and (v) at least one setting spring configured to apply a biasing force on the pilot piston and the pilot poppet in a distal direction to seat the pilot poppet at a pilot poppet seat. The valve is configured to operate in at least two modes of operation: (i) a counterbalance valve mode of operation in which the first fluid force and the second fluid force cooperate to overcome the biasing force of the at least one setting spring, thereby unseating the pilot poppet and fluidly coupling the first port to the second port, and (ii) a proportional flow control mode of operation in which the solenoid actuator sleeve moves to the actuated state, thereby allowing the fourth port to be fluidly coupled to: (a) the first port to provide fluid flow thereto, and (b) the third port to provide the output pilot fluid signal to be communicated externally.

In a second example implementation, the present disclosure describes a hydraulic system including a source of fluid; a reservoir; an actuator having a first chamber and a second chamber therein; a counterbalance valve comprising: (i) a load port fluidly coupled to the second chamber of the actuator, and (ii) a pilot port, wherein the counterbalance valve is configured to allow fluid flow from the load port to the reservoir when a pilot fluid signal is received at the pilot port; and a valve comprising: (i) a first port fluidly coupled to the first chamber of the actuator, (ii) a second port fluidly coupled to the reservoir, (iii) a third port configured to provide an output pilot fluid signal to the pilot port of the counterbalance valve and receive an input pilot fluid signal, and (iv) a fourth port fluidly coupled to the source of fluid. The valve further comprises: (i) a pilot poppet configured to be subjected to a first fluid force of fluid received at the first port acting on the pilot poppet in a proximal direction; (ii) a pilot piston interfacing with the pilot poppet and configured to be subjected to a second fluid force of the input pilot fluid signal acting on the pilot piston in the proximal direction; (iii) a solenoid actuator sleeve that is axially movable between an unactuated state and an actuated state; and (iv) at least one setting spring configured to apply a biasing force on the pilot piston and the pilot poppet in a distal direction to seat the pilot poppet at a pilot poppet seat, wherein the valve is configured to operate in at least two modes of operation: (i) a counterbalance valve mode of operation in which the first fluid force and the second fluid force cooperate to overcome the biasing force of the at least one setting spring, thereby unseating the pilot poppet and fluidly coupling the first port to the second port, and (ii) a proportional flow control mode of operation in which the solenoid actuator sleeve moves to the actuated state, thereby allowing the fourth port to be fluidly coupled to: (a) the first port to provide fluid flow to the first chamber of the actuator, and (b) the third port to provide the output pilot fluid signal to be communicated to the pilot port of the counterbalance valve to actuate the counterbalance valve and allow fluid to flow from the second chamber to the reservoir.

In a third example implementation, the present disclosure describes a method. The method includes: (i) receiving an electrical command signal energizing a solenoid coil of a valve, wherein the valve comprises: (a) a first port fluidly coupled to a chamber of an actuator, (b) a second port fluidly coupled to a reservoir, (c) a third port fluidly coupled to a pilot port of a counterbalance valve, and (d) a fourth port fluidly coupled to a source of fluid; (ii) responsively, operating the valve as a meter-in valve that: (a) meters fluid received at the fourth port and provides metered fluid to the first port to be provided to the chamber of the actuator, and (b) provides an output pilot fluid signal through the third port of the valve to the pilot port of the counterbalance valve; (iii) receiving an input pilot fluid signal at the third port of the valve; and (iv) responsively, operating the valve as in a counterbalance valve mode of operation, wherein fluid received at the first port from the chamber of the actuator flows through the valve to the second port of the valve, which is fluidly coupled to the reservoir.

The foregoing summary is illustrative only and is not intended to be in any way limiting. In addition to the illustrative aspects, implementations, and features described above, further aspects, implementations, and features will become apparent by reference to the figures and the following detailed description.

BRIEF DESCRIPTION OF THE FIGURES

The novel features believed characteristic of the illustrative examples are set forth in the appended claims. The illustrative examples, however, as well as a preferred mode of use, further objectives and descriptions thereof, will best be understood by reference to the following detailed description of an illustrative example of the present disclosure when read in conjunction with the accompanying Figures.

DETAILED DESCRIPTION

Figure 1:
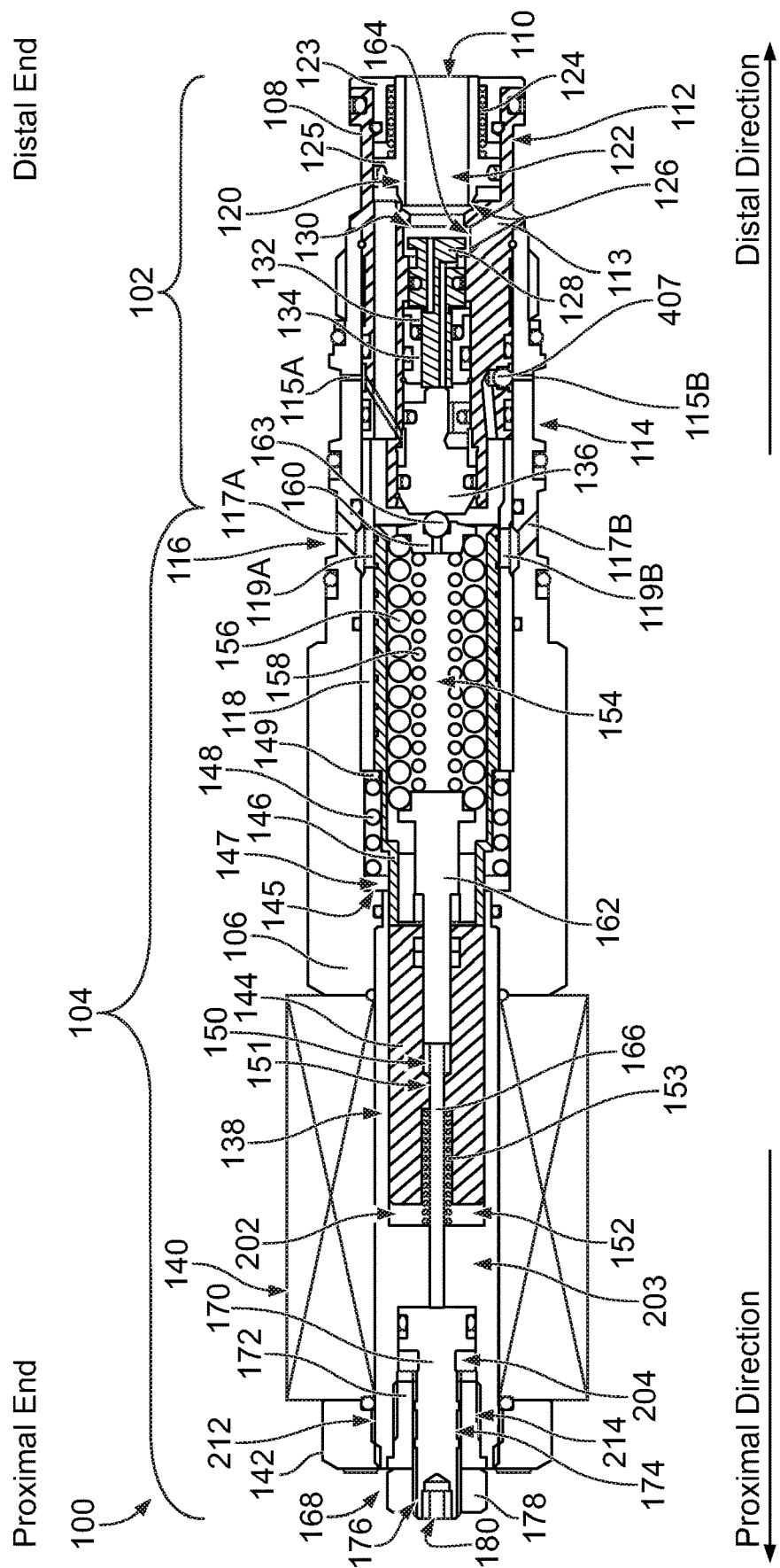
FIG. 1 illustrates a cross-sectional side view of a valve, in accordance with an example implementation.

In examples, a pilot-operated counterbalance valve can be used on the return side of a hydraulic actuator for lowering a large negative load in a controlled manner. The counterbalance valve generates a preload or back-pressure in the return line that acts against the main drive pressure so as to maintain a positive load, which therefore remains controllable. Particularly, if a speed of the actuator increases, pressure on one side of the actuator may drop and the counterbalance valve may then act to restrict the flow to controllably lower the load.

An example pilot-operated counterbalance valve can have three ports: a port fluidly coupled to a first side of the actuator (e.g., rod side of a hydraulic actuator cylinder), a second port operating as an outlet port that is fluidly coupled to a tank or reservoir, and a third port that can be referred to as a pilot port. The pilot port can be fluidly coupled via a pilot line to a supply line connected to a second side of the actuator (e.g., head side of the hydraulic actuator cylinder).

The counterbalance valve can have a spring that acts against a movable element (e.g., a spool or a poppet), and the force of the spring determines a pressure setting of the counterbalance valve. The pressure setting is the pressure level of fluid at the first port of the counterbalance valve that can cause the counterbalance valve to open.

The back-pressure in the first side of the actuator cooperates with a pilot signal provided via the pilot line to open the counterbalance valve. The counterbalance valve can be characterized by a ratio between a first surface area on which the pilot signal acts and a second surface area on which the pressure induced in the first side of the actuator acts within the counterbalance valve. Such ratio may be referred to as "pilot ratio."

The pilot signal effectively reduces the pressure setting of the counterbalance valve. The extent of reduction in the pressure setting is determined by the pilot ratio. For example, if the pilot ratio is 3 to 1 (3:1), then for each 10 bar increase in pressure level of the pilot signal, the pressure setting of the setting spring is reduced by 30 bar. As another example, if the pilot ratio is 8 to 1 (8:1), then for each 10 bar increase in the pressure level of pilot signal, the pressure setting of the setting spring is reduced by 80 bar.

At the same time, each side of the hydraulic actuator can be fluidly coupled to a flow control valve, i.e., meter-in valve, which controls fluid flow to the associated side of the hydraulic actuator. Thus, each side of the hydraulic actuator, i.e., the head side and the rod side, is fluidly coupled to a meter-in valve that controls fluid flow thereto and a counterbalance valve that controls fluid flow therefrom. In some examples, additional valves, e.g., check valves, can also be used to perform additional functionalities in the hydraulic system.

Conventional configurations can involve separate meter-in valve and counterbalance valve for each side and a manifold in which all the valves are disposed. Having at least four valves connected in a manifold can increase size, cost, and complexity of the manifold. Also, conventional systems involve the fluid flow exiting the counterbalance valve going through the meter-in valve before flowing to the reservoir. This configuration can lead to trapped fluid having high pressure in the hydraulic line connecting the counterbalance valve to the meter-in valve. To relieve such trapped fluid, a more complex vented counterbalance valve is often used.

Therefore, it may be desirable to have a valve that integrates meter-in valve operations along with counterbalance valve operations. This way, two valves rather than four separate valves can be used to operate the hydraulic actuator, thereby reducing complexity, cost, and size of the manifold. Also, it may be desirable that such valve provides direct fluid path for flow exiting the counterbalance valve portion of the disclosed valve to the reservoir. This way, no pressurized fluid is trapped as in conventional system.

FIG. 1 illustrates a cross-sectional side view of a valve 100, in accordance with an example implementation. The valve 100 may be inserted or screwed into a manifold having ports corresponding to ports of the valve 100 described below, and can thus fluidly coupled the valve 100 to other components of a hydraulic system.

The valve 100 includes a counterbalance valve portion 102 and a proportional flow control or meter-in valve portion 104. The valve 100 includes a housing 106 that includes a longitudinal cylindrical cavity therein. The longitudinal cylindrical cavity of the housing 106 is configured to house parts of the counterbalance valve portion 102 and the meter-in valve portion 104.

The valve 100 includes a main sleeve 108 received at a distal end of the housing 106. The valve 100 includes a first port 110 at a nose or distal end of the main sleeve 108. The first port 110 can also be referred to as a load port and is configured to be fluidly coupled to a chamber of a hydraulic actuator.

The valve 100 also includes a second port 112. The second port 112 can be referred to as a tank or reservoir port and can be configured to be fluidly coupled to a tank or reservoir of hydraulic fluid to provide return flow from the hydraulic actuator to the reservoir. The reservoir can have fluid at a low pressure level, e.g., 0-70 pounds per square inch (psi).

The second port 112 can include a set of return flow cross-holes, such as return flow cross-hole 113, disposed in the main sleeve 108.

The valve 100 also includes a third port 114. The third port 114 can be referred to as a pilot fluid signal port. The third port 114 can include a set of cross-holes that can be referred to as pilot signal cross-holes, disposed in the housing 106. Particularly, the third port 114 can include a first pilot signal cross-hole 115A and a second pilot signal cross-hole 115B. The first pilot signal cross-hole 115A is configured to receive an input pilot fluid signal to actuate the counterbalance valve portion 102 of the valve 100. Further, the valve 100 is configured such that, when the meter-in valve portion 104 is actuated, an output pilot fluid signal is communicated to the second pilot signal cross-hole 115B so as to provide or communicate the output pilot fluid signal externally to a pilot port of a counterbalance valve on the other side of the actuator.

The valve 100 can further include a fourth port 116. The fourth port 116 can be referred to as an inlet port and is configured to be coupled to a source of fluid (e.g., a pump, an accumulator, etc.) capable of providing fluid at high pressures (e.g., 1000-5000 psi). The fourth port 116 can include a set of cross-holes that can be referred to as inlet flow cross-holes, such as inlet flow cross-holes 117A, 117B, disposed in a radial array about the housing 106.

The valve 100 also includes a second sleeve 118 disposed within the housing 106 longitudinally adjacent to the main sleeve 108. The second sleeve 118 includes a respective set of cross-holes, such as cross-holes 119A, 119B, disposed in a radial array about the second sleeve 118. The cross-holes 119A, 119B of the second sleeve 118 are respectively fluidly coupled to the inlet flow cross-holes 117A, 117B.

The main sleeve 108 includes a respective longitudinal cylindrical cavity therein. The valve 100 includes a main flow piston 120 that is disposed, and slidably accommodated, in the longitudinal cylindrical cavity of the main sleeve 108. The term "piston" is used herein to encompass any type of movable element, such as a spool-type movable element or a poppet-type movable element.

Further, the term "slidably accommodated" is used throughout herein to indicate that a first component (e.g., the main flow piston 120) is positioned relative to a second component (e.g., the main sleeve 108) with sufficient clearance therebetween, enabling movement of the first component relative to the second component in the proximal and distal directions. As such, the first component (e.g., main flow piston 120) is not stationary, locked, or fixedly disposed in the valve 100, but rather, is allowed to move relative to the second component (e.g., the main sleeve 108).

A main chamber 122 is formed within the main sleeve 108, and the main flow piston 120 is hollow such that interior space of the main flow piston 120 is comprised in the main chamber 122. The main chamber 122 is fluidly coupled to the first port 110. The valve 100 includes a ring-shaped member 123 fixedly disposed, at least partially, within the main sleeve 108 at a distal end thereof. The valve 100 also includes a main flow check spring 124 disposed about an exterior peripheral surface of the main flow piston 120.

The ring-shaped member 123 protrudes radially inward within the cavity of the main sleeve 108 to form a support for a distal end of the main flow check spring 124. A proximal end of the main flow check spring 124 acts against a shoulder 125 projecting radially outward from the main flow piston 120. With this configuration, the distal end of the main flow check spring 124 is fixed, whereas the proximal end of the main flow check spring 124 is movable and interfaces with the main flow piston 120. Thus, the main flow check spring 124 is configured to bias the main flow piston 120 in a proximal direction (e.g., to the left in FIG. 1) toward the main sleeve 108.

A distal end of the main sleeve 108 forms a main piston seat 126. A tapered exterior peripheral surface of the main flow piston 120 at a proximal end thereof is configured to be seated at the main piston seat 126 when the meter-in valve portion 104 is unactuated. With this configuration, the main flow piston 120 and the main flow check spring 124 operate as a check valve configured to block fluid flow from the first port 110 to the fourth port 116 when the meter-in valve portion 104 is unactuated, while allowing fluid flow from the fourth port 116 to the first port 110 when the meter-in valve portion 104 is actuated as described below with respect to FIG. 5.

The valve 100 includes a pilot poppet 128 slidably accommodated within the main sleeve 108. When the counterbalance valve portion 102 is unactuated (i.e., when the valve 100 precludes fluid flow from the first port 110 to the second port 112), the pilot poppet 128 is configured to be seated at a pilot poppet seat 130 formed as a protrusion on an interior surface of the main sleeve 108.

As described in detail below with respect to FIG. 4, the counterbalance valve portion 102 is configured to be actuated when pressure level at the first port 110 and the pressure level of the pilot signal received at the third port 114 are sufficient to unseat the pilot poppet 128 off the pilot poppet seat 130. The valve 100 is shown in FIG. 1 with the pilot poppet 128 being unseated, thereby opening a fluid path from the first port 110 through the main chamber 122 then through the return flow cross-hole 113 to the reservoir that is fluidly coupled to the second port 112.

As depicted in FIG. 1, the pilot poppet 128 has a proximal portion that has a smaller diameter than a respective diameter of the distal portion of the pilot poppet 128. The proximal portion of the pilot poppet 128 is guided within a first spacer 132 and a second spacer 134 that are fixedly disposed within the main sleeve 108.

The valve 100 further includes a pilot piston 136 disposed longitudinally adjacent to the pilot poppet 128. The pilot piston 136 is configured such that a distal end of the pilot piston 136 contacts the pilot poppet 128, and therefore the pilot poppet 128 and the pilot piston 136 are configured to move axially together, whenever there is fluid pressure at the first port 110.

The valve 100, particularly the meter-in valve portion 104, includes a solenoid tube 138 configured as a cylindrical housing or body disposed within and received at a proximal end of the housing 106, such that the solenoid tube 138 is coaxial with the housing 106. A solenoid coil 140 can be disposed about an exterior surface of the solenoid tube 138. The solenoid coil 140 is retained between a proximal end of the housing 106 and a coil nut 142 having internal threads that can engage a threaded region formed on the exterior peripheral surface of the solenoid tube 138 at its proximal end.

Figure 2:
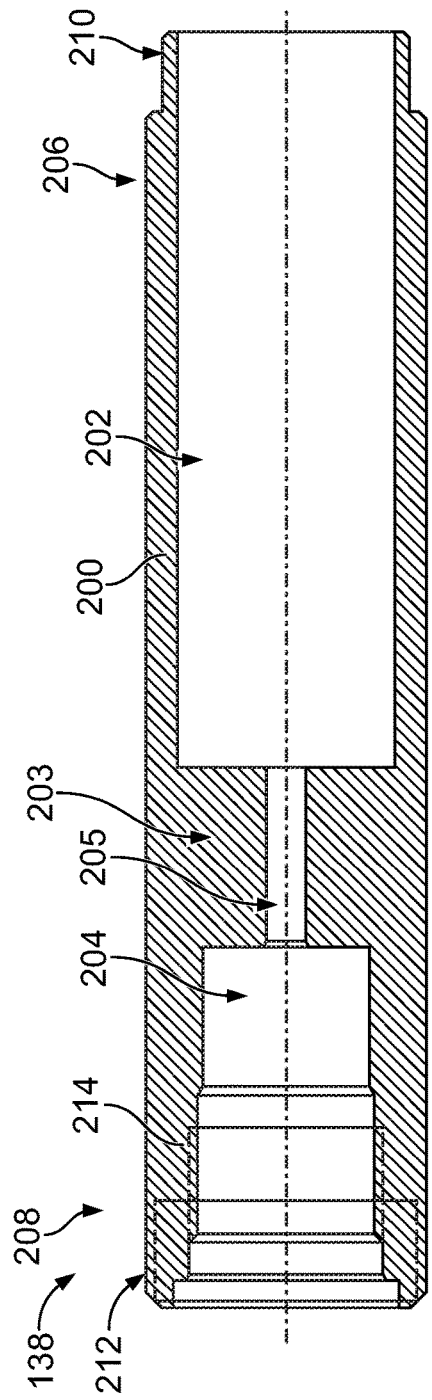
FIG. 2 illustrates cross-sectional side view of a solenoid tube, in accordance with an example implementation.

FIG. 2 illustrates a cross-sectional side view of the solenoid tube 138, in accordance with an example implementation. As depicted, the solenoid tube 138 has a cylindrical body 200 having therein a first chamber 202 within a distal side of the cylindrical body 200 and a second chamber 204 within a proximal side of the cylindrical body 200. The solenoid tube 138 includes a pole piece 203 formed as a protrusion within the cylindrical body 200. The pole piece 203 separates the first chamber 202 from the second chamber 204. In other words, the pole piece 203 divides a hollow interior of the cylindrical body 200 into the first chamber 202 and the second chamber 204. The pole piece 203 can be composed of material of high magnetic permeability.

Further, the pole piece 203 defines a channel 205 therethrough. In other words, an interior peripheral surface of the solenoid tube 138 at or through the pole piece 203 forms the channel 205, which fluidly couples the first chamber 202 to the second chamber 204. As such, pressurized fluid provided to the first chamber 202 is communicated through the channel 205 to the second chamber 204.

In examples, the channel 205 can be configured to receive a pin therethrough so as to transfer linear motion of one component in the second chamber 204 to another component in the first chamber 202 and vice versa, as described below. As such, the channel 205 can include chamfered circumferential surfaces at its ends (e.g., an end leading into the first chamber 202 and another end leading into the second chamber 204) to facilitate insertion of such a pin therethrough.

The solenoid tube 138 has a distal end 206, which is configured to be coupled to the housing 106, and a proximal end 208. Particularly, the solenoid tube 138 can have a first threaded region 210 disposed on an exterior peripheral surface of the cylindrical body 200 at the distal end 206 that is configured to threadedly engage with corresponding threads formed in the interior peripheral surface of the housing 106.

Also, the solenoid tube 138 can have a second threaded region 212 disposed on the exterior peripheral surface of the cylindrical body 200 at the proximal end 208 and configured to be threadedly engaged with corresponding threads formed in the interior peripheral surface of the coil nut 142. Further, the solenoid tube 138 can have a third threaded region 214 disposed on an interior peripheral surface of the cylindrical body 200 at the proximal end 208 and configured to threadedly engage with corresponding threads formed in a component of a manual adjustment actuator 168 as described below (see FIG. 1). The solenoid tube 138 can also have one or more shoulders formed in the interior peripheral surface of the cylindrical body 200 that can mate with respective shoulders of the manual adjustment actuator 168 to enable alignment of the manual adjustment actuator 168 within the solenoid tube 138.

Referring back to FIG. 1, the solenoid tube 138 is configured to house an armature 144 in the first chamber 202. The armature 144 is slidably accommodated within the solenoid tube 138 (i.e., the armature 144 can move axially within the solenoid tube 138).

The valve 100 further includes a solenoid actuator sleeve 146 disposed at the proximal end of the housing 106 and also disposed partially within a distal end of the solenoid tube 138. The armature 144 is mechanically coupled to, or linked with, the solenoid actuator sleeve 146. As such, if the armature 144 moves axially (e.g., in the proximal direction), the solenoid actuator sleeve 146 moves along with the armature 144 in the same direction. The solenoid actuator sleeve 146 is disposed through a guide piece 147.

Figure 3:
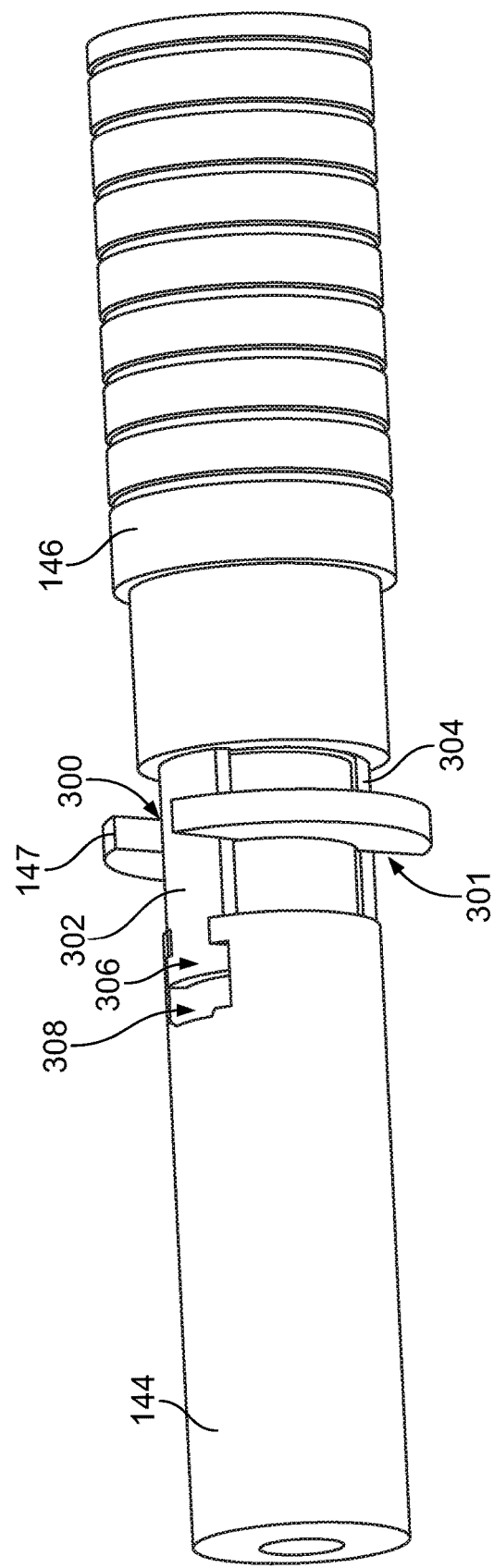
FIG. 3 illustrates a three-dimensional partial perspective view showing an armature coupled to a solenoid actuator sleeve, in accordance with another example implementation.

The armature 144 can be coupled to the solenoid actuator sleeve 146 in several ways. FIG. 3 illustrates a three-dimensional partial perspective view showing the armature 144 coupled to the solenoid actuator sleeve 146, in accordance with an example implementation. As shown, the guide piece 147 comprises two slots 300, 301 through which members 302, 304 of the solenoid actuator sleeve 146 extend to be coupled to the armature 144.

Particularly, the members 302, 304 have male T-shaped ends such as male T-shaped end 306 of the member 302, and the armature 144 can have a corresponding female T-slot 308 formed as an annular internal groove configured to receive the male T-shaped end 306. The term "T-shaped" is used herein to indicate a structure having two members that meet perpendicularly. With this configuration, the armature 144 and the solenoid actuator sleeve 146 are coupled to each other, such that if the armature 144 moves, the solenoid actuator sleeve 146 moves therewith.

Referring back to FIG. 1, the guide piece 147 rests or is secured against a shoulder 145 formed in the interior surface of the housing 106. The valve 100 further includes a main spring 148 disposed between a ring-shaped spacer 149 and the guide piece 147. The ring-shaped spacer 149 is disposed at a proximal end of the second sleeve 118 and is configured to interact with a protrusion on an exterior peripheral surface of the solenoid actuator sleeve 146. With this configuration, the main spring 148 applies a respective biasing force against the solenoid actuator sleeve 146 in the distal direction. When the armature 144 and the solenoid actuator sleeve 146 move in the proximal direction (e.g., to the left in FIG. 1), the solenoid actuator sleeve 146 compresses the main spring 148 and moves against its biasing force.

The armature 144 includes a longitudinal channel 150 formed therein. The armature 144 further includes a protrusion 151 within the longitudinal channel 150 that can be configured to guide linear motion of components such as spring cap 162 and pin 166 described below.

As mentioned above, the solenoid tube 138 includes the pole piece 203 formed as a protrusion within the cylindrical body 200. The pole piece 203 is separated from the armature 144 by the airgap 152. The valve 100 further includes an armature spring 153 that applies a biasing force on the armature 144 in the distal direction that can ensure axial contact between components of the valve 100 when the valve 100 is oriented vertically, for example.

The solenoid actuator sleeve 146 forms therein a chamber 154 configured to house one or more setting springs. In the example implementation shown in FIG. 1, the valve 100 includes a nested spring configuration comprising a first setting spring 156 and a second setting springs 158 disposed in the chamber 154 within the solenoid actuator sleeve 146.

The setting springs 156, 158 are disposed between a distal or first spring cap 160 and a proximal or second spring cap 162. As such, respective distal ends of the setting springs 156, 158 contact the first spring cap 160, whereas respective proximal ends of the setting springs 156, 158 contact the second spring cap 160.

The first spring cap 160 can also be referred to as a pilot spring cap as it interfaces with the pilot piston 136. As depicted in FIG. 1, the first spring cap 160 receives at a distal tip thereof a ball 163 that contacts a proximal end of the pilot piston 136. As such, the setting springs 156, 158 apply a biasing force on the pilot poppet 128 toward the pilot poppet seat 130 via the first spring cap 160, the ball 163, and the pilot piston 136.

With the configuration of the valve 100 shown in FIG. 1, the first setting spring 156 and the second setting spring 158 are disposed in parallel with respect to the first spring cap 160, the pilot piston 136, and the pilot poppet 128. Particularly, any fluid force applied to the pilot poppet 128 is the sum of the forces applied respectively to the setting springs 156, 158, and the amount of strain (deformation) or axial motion of the pilot poppet 128 is the same as the strains of the individual setting springs 156, 158.

As such, the combination of the first setting spring 156 and the second setting spring 158 has an equivalent or effective spring rate $k_{eq}$ that is the summation of the respective spring rates of the setting springs 156, 158. Particularly, the effective spring rate $k_{eq}$ can be determined as $k_1+k_2$, where $k_1$ is the spring rate of the setting spring 156, and the $k_2$ is the spring rate of the setting spring 158. It should be noted, however, that in other example implementations, one setting spring can be used.

The effective spring rate $k_{eq}$ determines a magnitude of a biasing force applied on the pilot poppet 128 in the distal direction by way of the combined action of the setting springs 156, 158. In other words, the first setting spring 156 and the second setting spring 158 cooperate to apply a biasing force on the pilot poppet 128 in the distal direction. Such biasing force determines the pressure setting of the valve 100, where the pressure setting is the pressure level of fluid at the first port 110 at which the valve 100 can open to provide fluid from the first port 110 to the second port 112.

Specifically, based on the equivalent spring rate $k_{eq}$ of the setting springs 156, 158 and their respective lengths, the setting springs 156, 158 exert a particular preload or biasing force on the first spring cap 160, the pilot piston 136, and the pilot poppet 128 in the distal direction, thus causing the pilot poppet 128 to be seated at the pilot poppet seat 130 of the main sleeve 108. The biasing force of the setting springs 156, 158 determines the pressure setting of the counterbalance valve portion 102 of the valve 100 as described below.

Figure 4:
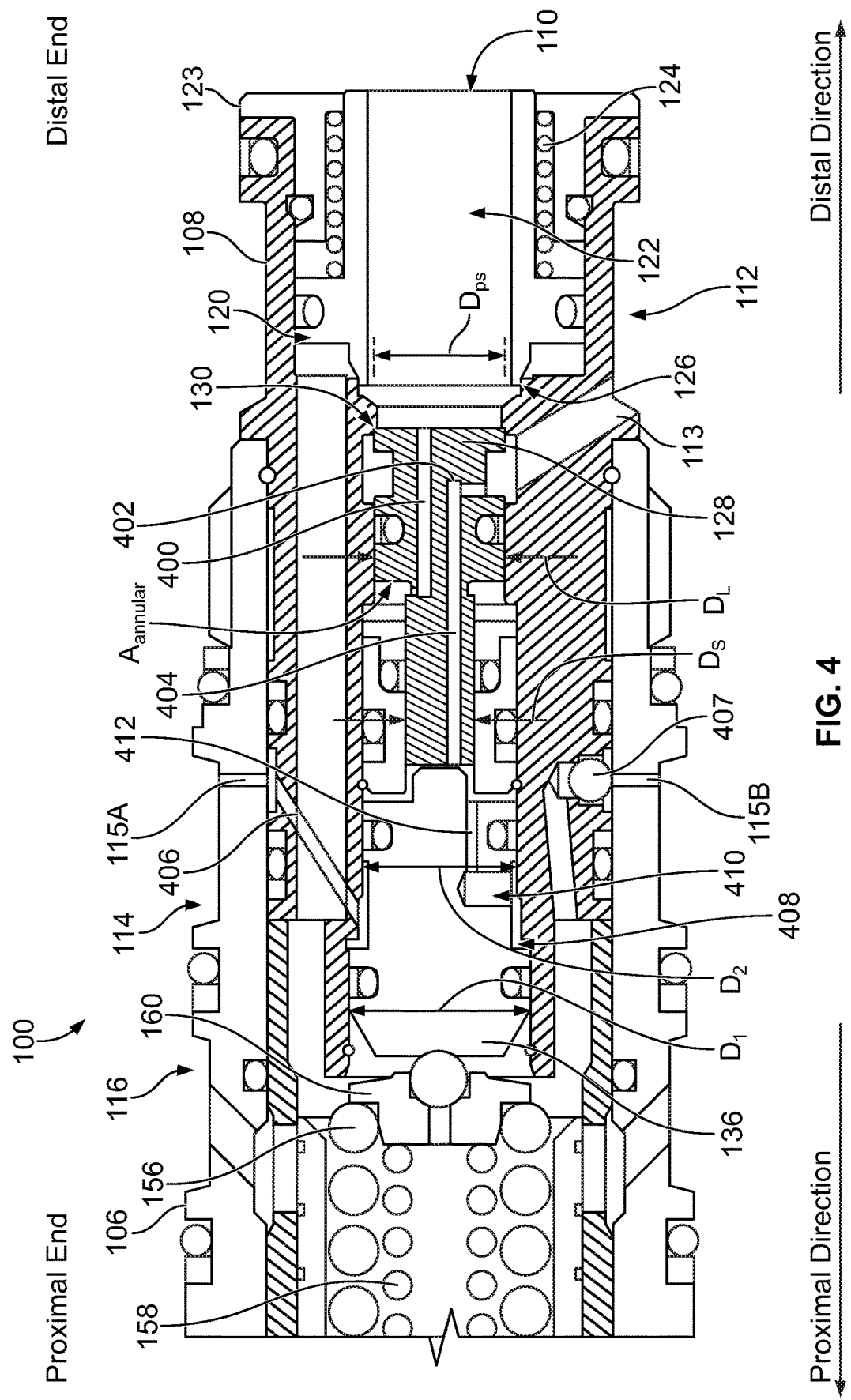
FIG. 4 illustrates a partial cross-sectional side view of a counterbalance valve portion of a valve, in accordance with an example implementation.

FIG. 4 illustrates a partial cross-sectional side view of the counterbalance valve portion 102 of the valve 100, in accordance with an example implementation. As mentioned above, pressurized fluid received at the first port 110 is communicated through the main chamber 122 to the pilot poppet 128. The pressurized fluid thus applies a force in the proximal direction (e.g., to the left in FIG. 4) on an area of the pilot poppet 128 that is equal to the circular area of the pilot poppet seat 130. Assuming that the diameter of the pilot poppet seat 130 is $D_{PS}$ as labeled in FIG. 4, the area of the pilot poppet seat 130 is $$A_{PS} = \pi \frac{D_{PS}^2}{4}.$$

Further, as depicted in FIG. 4, the pilot poppet 128 has a first longitudinal channel 400 that communicates fluid received at the first port 110 to an annular surface area $A_{annular}$ at the back end of the distal portion of the pilot poppet 128 as labeled in FIG. 4. Assuming the distal portion of the pilot poppet 128 has a large diameter of $D_L$ and the proximal portion has a small diameter $D_S$ as labeled in FIG. 4, the pressurized fluid communicated through the first longitudinal channel 400 applies a force on the pilot poppet 128 in the distal direction (to the right in FIG. 4) on the annular surface area $$A_{annular} = \pi \frac{(D_L^2 - D_S^2)}{4}.$$

The pilot poppet 128 further has an orifice 402 and a second longitudinal channel 404 that fluidly couples the second port 112 via the return flow cross-hole 113 to the proximal end of the pilot poppet 128. The fluid at the second port 112 is in communication with the reservoir and acts as a reference pressure (e.g., a pressure level that is substantially equal to zero or atmospheric pressure). Thus, fluid having pressure level of fluid in the reservoir applies a force on the pilot poppet 128 in the distal direction (e.g., to the right in FIG. 4) that can be determined by multiplying the pressure level by the area $$A_S = \pi \frac{D_S^2}{4}.$$

The pressure level of the fluid at the second port 112 is low (e.g., 0-70 psi), and therefore the force that such fluid applies on the pilot poppet 128 may be negligible.

Assuming the reference pressure is substantially equal to zero, the pressurized fluid at the first port 110 applies a net force in the proximal direction (e.g., to the left in FIG. 4) on the pilot poppet 128 that is equal to $F_{Proximal,PP}=P_1(A_{PS}-A_{annular})$, where $P_1$ is the pressure level of fluid at the first port 110. The difference $A_{PS}$ minus $A_{annular}$ can be referred to as effective or differential relief area $A_{DR}$. The pressure setting of the valve 100 can be determined by dividing the biasing force that the setting springs 156, 158 applies to the pilot poppet 128 (via the first spring cap 160 and the pilot piston 136) by the differential relief area $A_{DR}$. The net force $F_{Proximal,PP}$ might not be sufficiently large to overcome the pressure setting of the valve 100 (e.g., overcome the force of the setting springs 156, 158 on the pilot poppet 128) if pressure level of fluid at the first port 110 is not sufficiently high. The net force is, however, supplemented by a force applied to the pilot piston 136 by the pilot pressure fluid signal received at the third port 114.

The pilot pressure fluid signal received at the third port 114 is communicated through the first pilot signal cross-hole 115A and a channel 406 (a slanted channel disposed in the main sleeve 108) to an annular groove 408 formed on an exterior peripheral surface of the pilot piston 136. As depicted, the valve 100 includes a check ball 407 that blocks fluid received at the second pilot signal cross-hole 115B. The term "block" is used throughout herein to indicate substantially preventing fluid flow except for minimal or leakage flow of drops per minute, for example.

As depicted in FIG. 4, the pilot piston 136 is configured to have lands alternating with reduced diameter regions to form the annular groove 408 on the exterior peripheral surface of the pilot piston 136. The annular groove 408 is bounded by (i) a first annular surface area $A_1$, and (ii) a second annular surface area $A_2$, where the annular surface area $A_1$ is larger than the annular surface area $A_1$. Specifically, the difference $A_1$ minus $A_2$ can be determined as $$\pi \frac{(D_1^2 - D_2^2)}{4}$$

where $D_1$ is a larger diameter of the pilot piston 136 and $D_2$ is a smaller diameter of the pilot piston 136 as labeled in FIG. 4. The difference $A_1$ minus $A_2$ can be referred to as effective or differential pilot area $A_{DP}$.

As such, the pilot pressure fluid signal provided to the annular groove 408 applies respective forces in opposite directions on the annular surfaces areas $A_1$ and $A_2$. Because $A_1$ is larger than $A_2$, the pilot pressure fluid signal applies a net force on the pilot piston 136 in the proximal direction (e.g., to the left in FIG. 4). The net force can be determined, for example, by multiplying a pressure level of the pilot pressure fluid signal by the differential area $A_{DP}$. The pilot pressure fluid signal then flows from the annular groove 408 through a blind hole 410 and orifice 412 formed in the pilot piston 136, then through the longitudinal channel 404 and the orifice 402 of the pilot poppet 128, then through the return flow cross-hole 113 to the second port 112, which can be fluidly coupled to a reservoir.

As mentioned above and as illustrated in FIGS. 1 and 4, the pilot piston 136 and the pilot poppet 128 are in contact with each other. In other words, the pilot piston 136 and the pilot poppet 128 can be considered as one element when considering the forces acting thereupon.

With the configuration of the valve 100, several forces are applied to the pilot poppet 128 and the pilot piston 136. The setting springs 156, 158 apply a first force on the pilot piston 136 and the pilot poppet 128 via the first spring cap 160 in the distal direction. Fluid from the second port 112 applies a second force on the pilot poppet 128 in the distal direction as well, but such force can be negligible as mentioned above. On the other hand, the pressurized fluid at the first port 110 applies a third force on the pilot poppet 128 and the pilot piston 136 in the proximal direction, and the pilot pressure fluid signal received at the third port 114 applies a fourth force on the pilot piston 136 also in the proximal direction.

When the pressure levels of the pressurized fluid at the first port 110 and the pilot pressure fluid signal at the third port 114 are sufficiently high to cause the third and fourth forces acting in the proximal direction to overcome the first force of the setting springs 156, 158 and the second force of the fluid from the second port 112 acting in the distal direction, the pilot poppet 128 and the pilot piston 136 can be pushed or displaced axially in the proximal direction. As such, the pilot poppet 128 can be unseated off the pilot poppet seat 130 formed in the main sleeve 108.

As the pilot poppet 128 moves axially in the proximal direction, the pilot poppet 128 can push the pilot piston 136 and the first spring cap 160 in the proximal direction against the setting springs 156, 158, thereby compressing the setting springs 156, 158. As a result of compression of the setting springs 156, 158, the first force that the setting springs 156, 158 apply on the pilot poppet 128 in the distal direction increases. Thus, the pilot poppet 128 can move axially in the proximal direction until force equilibrium between the third and fourth forces on one hand, and the increased first force and the second force on the other hand is reached.

FIG. 1 illustrates the valve 100 with the pilot poppet 128 being unseated off the pilot poppet seat 130, thereby forming a flow area 164. As such, a flow path is formed and fluid at the first port 110 flows through the main chamber 122, the flow area 164, the return flow cross-hole 113, then to the second port 112, which can be fluidly coupled to the reservoir.

As mentioned above, a pilot ratio of a counterbalance valve determines how the pressure setting of the counterbalance valve changes as the pilot pressure (i.e., the pressure level of the pilot pressure fluid signal at the third port 114) changes. As an example, a 3:1 pilot ratio indicates that an increase of, for example, 10 bar in the pilot pressure decreases the pressure setting by 30 bar. With the configuration of the valve 100, the pilot ratio $P_R$ can be determined as $$P_R = \frac{A_{DP}}{A_{DR}}.$$

In some applications, it may be desirable to have a manual adjustment actuator coupled to the valve 100 so as to allow for manual modification of the preload of the setting springs 156, 158, while the valve 100 is installed in the hydraulic system without disassembling the valve 100. Particularly, the valve 100 includes a pin 166 disposed in the longitudinal channel 150 of the armature 144, and the pin 166 is in contact with the second spring cap 162. With this configuration, axial movement of the pin 166 causes the second spring cap 162 to also move axially, thereby changing the length of the setting springs 156, 158 and modifying their preload. Modification of the preload of the setting springs 156, 158 causes modification of the pressure setting of the valve 100.

FIG. 1 illustrates the valve 100 having a manual adjustment actuator 168. The manual adjustment actuator 168 is configured to allow for adjusting a maximum pressure setting of the valve 100 without disassembling the valve 100. The manual adjustment actuator 168 includes an adjustment piston 170 that interfaces with or contacts the pin 166, such that longitudinal or axial motion of the adjustment piston 170 causes the pin 166 and the second spring cap 162 coupled thereto to move axially therewith. The adjustment piston 170 can be threadedly coupled to a nut 172 at threaded region 174. The nut 172 in turn is threadedly coupled to the solenoid tube 138 at the threaded region 214. As such, the adjustment piston 170 is coupled to the solenoid tube 138 via the nut 172. Further, the adjustment piston 170 is threadedly coupled at threaded region 176 to another nut 178.

The adjustment piston 170 is axially movable within the second chamber 204 of the solenoid tube 138. For instance, the adjustment piston 170 can include an adjustment screw 180, such that if the adjustment screw 180 is rotated in a first rotational direction (e.g., clockwise) the adjustment piston 170 moves in the distal direction (e.g., to the right in FIG. 1) by engaging more threads of the threaded regions 174, 176. If the adjustment screw 180 is rotated in a second rotational direction (e.g., counter-clockwise) the adjustment piston 170 is allowed to move in the proximal direction (e.g., to the left in FIG. 1) by disengaging some threads of the threaded regions 174, 176.

Axial motion of the adjustment piston 170 results in axial motion of the pin 166 and the second spring cap 162, which is in contact with the proximal ends of the setting springs 156, 158. Thus, axial motion of the adjustment piston 170 causes a change in the length of the setting springs 156, 158.

If the adjustment piston 170 moves in the distal direction, the setting springs 156, 158 are compressed, and the biasing force applied to the first spring cap 160, the pilot piston 136, and the pilot poppet 128 increases, thereby increasing the pressure setting of the valve 100. If the adjustment piston 170 moves in the proximal direction, the setting springs 156, 158 are allowed to extend and relax, and the biasing force applied to the first spring cap 160, the pilot piston 136, and the pilot poppet 128 decreases, thereby decreasing the pressure setting of the valve 100. With this configuration, the pressure setting of the valve 100 can be adjusted via the manual adjustment actuator 168 without disassembling the valve 100.

In addition to operating in a counterbalance valve mode of operation as described above with respect to FIGS. 1 and 4, the valve 100 can also operate as a proportional fluid flow control or meter-in valve that meters fluid from the fourth port 116 to the first port 110.

Figure 5:
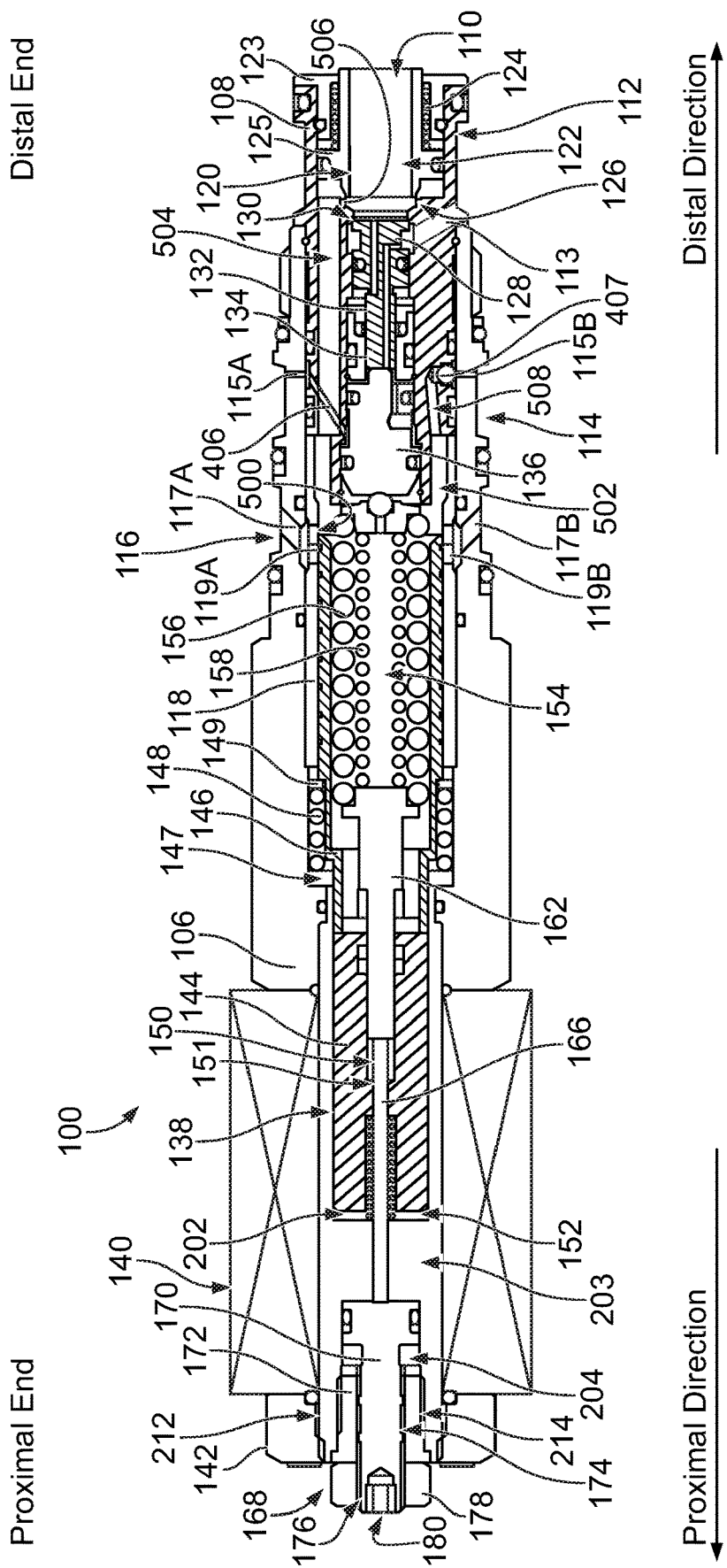
FIG. 5 illustrates a cross-sectional side view of a valve operating as a meter-in valve controlling fluid flow from a fourth port to a first port, in accordance with an example implementation.

FIG. 5 illustrates a cross-sectional side view of the valve 100 operating as a meter-in valve controlling fluid flow from the fourth port 116 to the first port 110, in accordance with an example implementation. When an electrical current is provided through the windings of the solenoid coil 140, a magnetic field is generated. The pole piece 203 directs the magnetic field through the airgap 152 toward the armature 144, which is movable and is attracted toward the pole piece 203. In other words, when an electrical current is applied to the solenoid coil 140, the generated magnetic field forms a north and south pole in the pole piece 203 and the armature 144, and therefore the pole piece 203 and the armature 144 are attracted to each other. Because the pole piece 203 is fixed and the armature 144 is movable, the armature 144 can traverse the airgap 152 toward the pole piece 203, and the airgap 152 is reduced in size. As such, a solenoid force is applied on the armature 144, where the solenoid force is a pulling force that tends to pull the armature 144 in the proximal direction (to the left in FIG. 5). The solenoid force is proportional to a magnitude of the electrical command or signal (e.g., magnitude of electrical current or voltage applied to the solenoid coil 140).

The solenoid force applied to the armature 144 is also applied to the solenoid actuator sleeve 146, which is coupled to the armature 144 as described above. As the armature 144 is pulled in the proximal direction, the armature 144 causes the solenoid actuator sleeve 146 coupled thereto to move in the proximal direction as well.

As a result of the motion of the solenoid actuator sleeve 146 in the proximal direction, the main spring 148 is compressed in the proximal direction. Thus, the biasing force that the main spring 148 applies on the solenoid actuator sleeve 146 increases. The armature 144 and the solenoid actuator sleeve 146 can move in the proximal direction until the biasing force of the main spring 148 balances the solenoid force. As such, the axial position of the armature 144 and the solenoid actuator sleeve 146 can be proportional to the command signal provided to the solenoid coil 140.

As the solenoid actuator sleeve 146 starts to move past a distal edge of the cross-holes 119A, 119B of the second sleeve 118 as depicted in FIG. 5, the cross-holes 119A, 119B become partially unblocked (e.g., at least a portion of the cross-holes 119A, 119B is exposed). The partial opening of the cross-holes 119A, 119B (the extent of portion of the cross-holes 119A, 119B that is exposed) can be referred to as a flow restriction 500.

As a result, fluid received at the fourth port 116 (which can be fluidly coupled to a source of fluid such as a pump) flows through the inlet flow cross-holes 117A, 117B, the cross-holes 119A, 119B, and the flow restriction 500 to an annular chamber 502. Fluid can then flow from the annular chamber 502 through a longitudinal channel 504 disposed in the main sleeve 108. The longitudinal channel 504 is isolated from (e.g., fluidly decoupled from and does not intersect with) the channel 406.

Fluid provided through the longitudinal channel 504 then applies a respective fluid force on the main flow piston 120 in the distal direction. The fluid force applied on the main flow piston 120 can push the main flow piston 120 in the distal direction against the main flow check spring 124, thereby unseating the main flow piston 120 off the main piston seat 126. As a result, a flow area 506 is formed, and fluid can flow through the flow area 506 and the main chamber 122 to the first port 110, which is fluidly coupled to a first chamber of a hydraulic actuator. Fluid flow from the fourth port 116 to the first port 110 can be referred to as meter-in flow.

Fluid exiting from a second chamber of the hydraulic actuator is provided to a counterbalance valve to allow the fluid exiting the second chamber to flow to the reservoir. To actuate the counterbalance valve, the fluid in the annular chamber 502 of the valve 100 flows through another longitudinal channel 508 disposed in the main sleeve 108, pushing the check ball 407 and flowing to the second pilot signal cross-hole 115B and the third port 114. The third port 114 can be fluidly coupled to a pilot port of the counterbalance valve to provide a pilot signal thereto and actuate the counterbalance valve. In examples, the counterbalance valve can be another valve 100 disposed on the other side of the hydraulic actuator and operating in the counterbalance valve mode described above with respect to FIG. 4.

Thus, the valve 100 can be used as both a meter-in valve and a counterbalance valve in various hydraulic systems.

Figure 6:
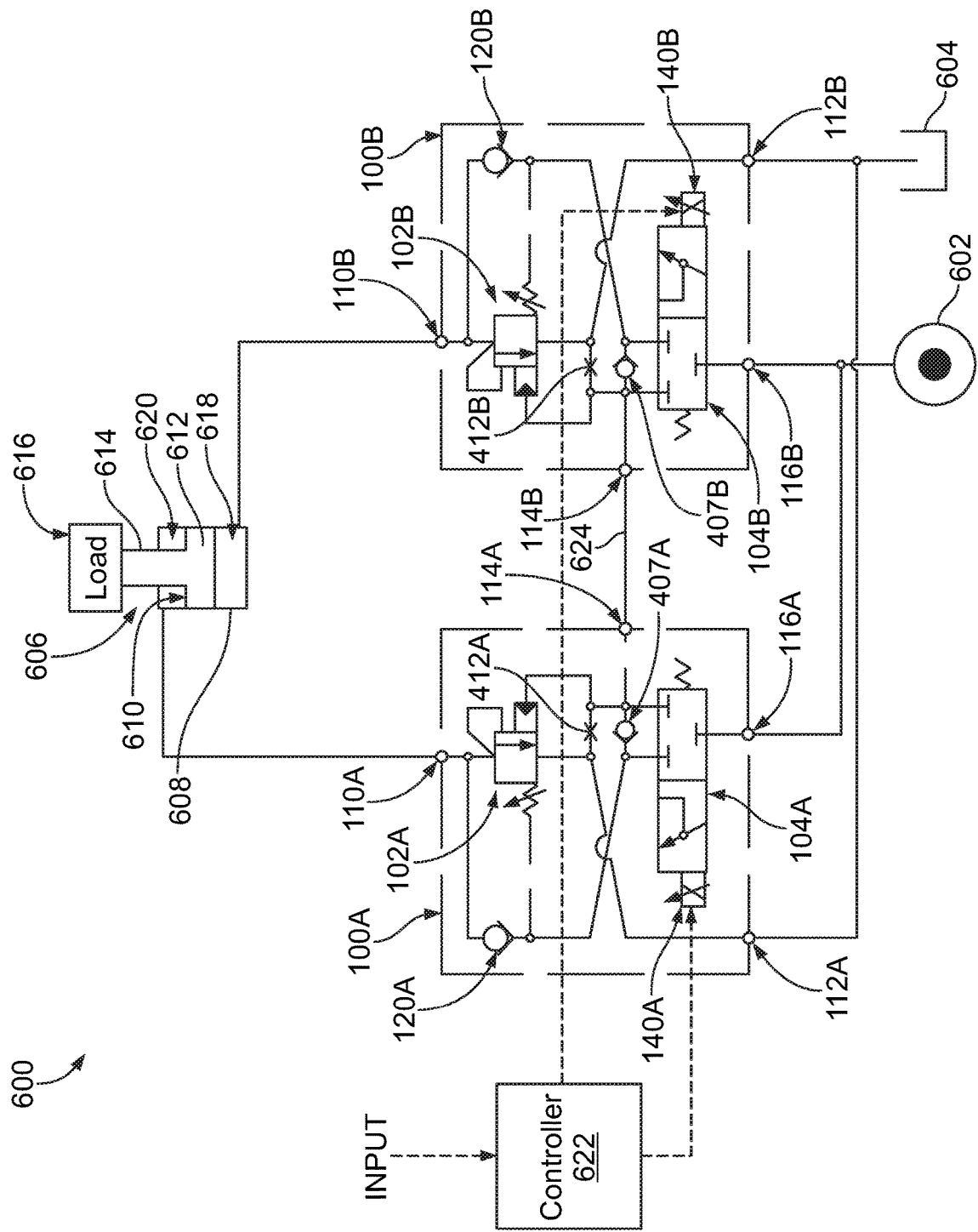
FIG. 6 illustrates a hydraulic system, in accordance with an example implementation.

FIG. 6 illustrates a hydraulic system 600, in accordance with an example implementation. The hydraulic system 600 includes two valves 100A, 100B that each symbolically represents the valve 100. The valves 100A, 100B have the same components of the valve 100. Therefore, the components or elements of the valves 100A, 100B are designated with the same reference numbers used for the valve 100 with an "A" or "B" suffix to correspond to the valves 100A, 100B respectively.

The hydraulic system 600 includes a source 602 of fluid. The source 602 of fluid can, for example, be a pump configured to provide fluid to the ports 116A, 116B of the valves 100A, 100B. Such pump can be a fixed displacement pump, a variable displacement pump, or a load-sensing variable displacement pump, as examples. Additionally or alternatively, the source 602 of fluid can be an accumulator.

The hydraulic system 600 also includes a reservoir 604 of fluid that can store fluid at a low pressure (e.g., 0-70 psi). The second ports 112A, 112B of the valves 100A, 100B are respectively fluidly coupled to the reservoir 604. The source 602 of fluid can be configured to receive fluid from the reservoir 604, pressurize the fluid, then provide pressurized fluid to the ports 116A, 116B of the valves 100A, 100B, respectively.

The valves 100A, 100B operate as meter-in valves and counterbalance valves to control fluid flow to and from an actuator 606. The actuator 606 includes a cylinder 608 and a piston 610 slidably accommodated in the cylinder 608. The piston 610 includes a piston head 612 and a rod 614 extending from the piston head 612 along a central longitudinal axis direction of the cylinder 608. The rod 614 is coupled to a load 616 and the piston head 612 divides the inside space of the cylinder 608 into a first chamber 618 and a second chamber 620.

As shown in FIG. 6, the port 110A of the valve 100A is fluidly coupled to the second chamber 620 of the actuator 606, whereas the port 110B of the valve 100B is fluidly coupled to the first chamber 618 of the actuator 606.

The hydraulic system 600 can further include a controller 622. The controller 622 can include one or more processors or microprocessors and may include data storage (e.g., memory, transitory computer-readable medium, non-transitory computer-readable medium, etc.). The data storage may have stored thereon instructions that, when executed by the one or more processors of the controller 622, cause the controller 622 to perform operations described herein. Signal lines to and from the controller 622 are depicted as dashed lines in FIG. 6.

The controller 622 can receive input or input information comprising sensor information via signals from various sensors or input devices in the hydraulic system 600, and in response provide electrical signals to various components of the hydraulic system 600. For example, the controller 622 can receive a command or an input (e.g., from a joystick of a machine) to move the piston 610 in a given direction at a particular desired speed (e.g., to extend or retract the piston 610). The controller 622 can then provide a signal to the valve 100A or the valve 100B to move the piston 610 in the commanded direction and at a desired commanded speed in a controlled manner.

For example, to extend the piston 610 (i.e., move the piston 610 upward in FIG. 6), the controller 622 can send a command signal to the solenoid coil 140B of the valve 100B to actuate it and operate it as a meter-in valve as described above with respect to FIG. 5. As a result, fluid is provided from the source 602 to the port 116B of the valve 100B, metered through the valve 100B, and then provided to the port 110B of the valve 100B. Fluid then flows to the first chamber 618 of the actuator 606 to extend the piston 610. As the piston 610 extends, fluid is forced out of the second chamber 620 and is provided to the port 110A of the valve 100A.

In addition to fluid being metered through the valve 100B as it flows from the port 116B to the port 110B, a pilot fluid signal is provided from the port 116B to the port 114B. The port 114B of the valve 100B is fluidly coupled through a pilot line 624 to the port 114A of the valve 100A.

The pilot fluid signal provided to the port 114A of the valve 100A causes the valve 100A to operate as a counterbalance valve. In other words, the pilot fluid signal provided to the port 114A can actuate the counterbalance valve portion 102A of the valve 100A as described above with respect to FIG. 4 to allow fluid provided to the port 110A from the second chamber 620 to flow to the port 112A, which is fluidly coupled to the reservoir 604. As such, the piston 610 extends at a speed that is based on the magnitude of the command signal provided to the solenoid coil 140B.

To retract the piston 610 (i.e., move the piston 610 downward in FIG. 6), the controller 622 can send a command signal to the solenoid coil 140A of the valve 100A to actuate it and operate it as a meter-in valve as described above with respect to FIG. 5. As a result, fluid is provided from the source 602 to the port 116A of the valve 100A, metered through the valve 100A, and then provided to the port 110A of the valve 100A. Fluid then flows to the second chamber 620 of the actuator 606 to retract the piston 610. As the piston 610 retracts, fluid is forced out of the first chamber 618 and is provided to the port 110B of the valve 100B.

In addition to fluid being metered through the valve 100A as it flows from the port 116A to the port 110A, a pilot fluid signal is provided from the port 116A to the port 114A. The port 114A of the valve 100A is fluidly coupled through the pilot line 624 to the port 114B of the valve 100B.

The pilot fluid signal provided to the port 114B of the valve 100B causes the valve 100B to operate as a counterbalance valve. In other words, the pilot fluid signal provided to the port 114B can actuate the counterbalance valve portion 102B of the valve 100B as described above with respect to FIG. 4 to allow fluid provided to the port 110B from the first chamber 618 to flow to the port 112B, which is fluidly coupled to the reservoir 604. As such, the piston 610 retracts at a speed that is based on the magnitude of the command signal provided to the solenoid coil 140A.

In contrast to conventional configurations that involve separate meter-in valve and counterbalance valve for each of the chambers 618, 620 and a manifold in which all the valves are disposed, each of the valves 100A, 100B perform the operations of both a meter-in valve and a counterbalance valve. As such, only two valves are used in the hydraulic system 600 rather than four valves. Further, functionality of the check valves represented by the main flow pistons 120A, 120B are integrated in the valves 100A, 100B, and no additional check valves are needed to preclude fluid flow from the ports 110A, 110B to the ports 116A, 116B, respectively. Therefore, size, cost, and complexity of a manifold housing the valves 100A, 100B can be reduced.

Further, the configuration of the valves 100A, 100B provide for a direct path from their respective counterbalance valve portions 102A, 102B to the reservoir 604. Therefore, no pressurized fluid is trapped between the counterbalance valve portions 102A, 102B and a directional valve as in conventional systems, and no expensive vented counterbalance valves are needed in the hydraulic system 600.

Figure 7:
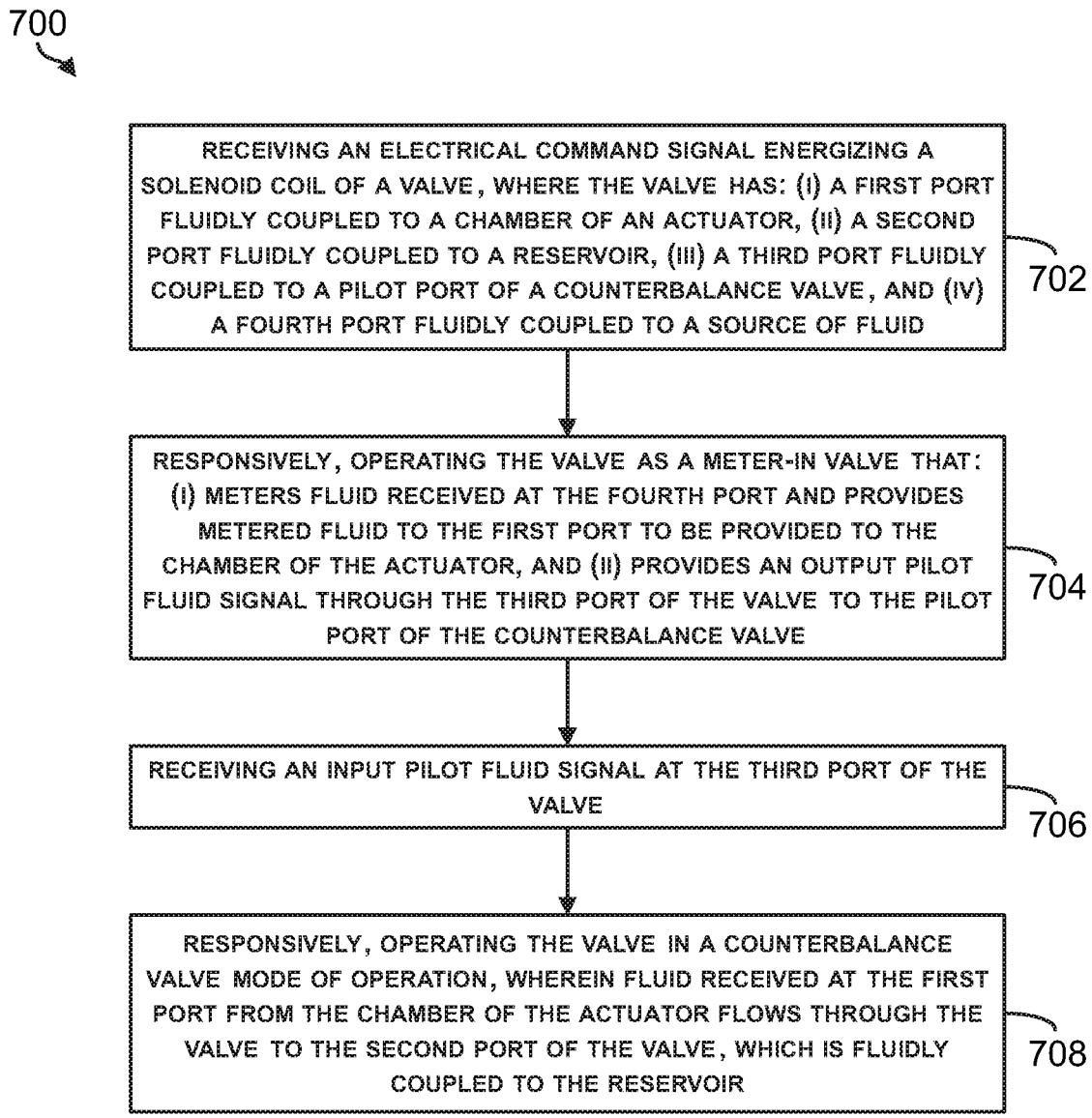
FIG. 7 is a flowchart of a method for operating a valve, in accordance with an example implementation.

FIG. 7 is a flowchart of a method 700 for operating a valve, in accordance with an example implementation. The method 700 shown in FIG. 7 presents an example of a method that can be used with the valve 100 (e.g., the valves 100A, 100B) shown throughout the Figures, for example. The method 700 may include one or more operations, functions, or actions as illustrated by one or more of blocks 702-708. Although the blocks are illustrated in a sequential order, these blocks may also be performed in parallel, and/or in a different order than those described herein. Also, the various blocks may be combined into fewer blocks, divided into additional blocks, and/or removed based upon the desired implementation. It should be understood that for this and other processes and methods disclosed herein, flowcharts show functionality and operation of one possible implementation of present examples. Alternative implementations are included within the scope of the examples of the present disclosure in which functions may be executed out of order from that shown or discussed, including substantially concurrent or in reverse order, depending on the functionality involved, as would be understood by those reasonably skilled in the art.

At block 702, the method 700 includes receiving an electrical command signal (e.g., from the controller 622) energizing the solenoid coil 140 of the valve 100, where the valve 100 has: (i) the first port 110 fluidly coupled to a chamber (e.g., the second chamber 620) of an actuator (e.g., the actuator 606), (ii) the second port 112 fluidly coupled to a reservoir (e.g., the reservoir 604), (iii) the third port 114 fluidly coupled to a pilot port of a counterbalance valve, and (iv) the fourth port 116 fluidly coupled to a source of fluid (e.g., the source 602).

At block 704, the method 700 includes, responsively, operating the valve 100 as a meter-in valve that: (i) meters fluid received at the fourth port 116 and provides metered fluid to the first port 110 to be provided to the chamber of the actuator, and (ii) provides an output pilot fluid signal to through the third port 114 of the valve 100 to the pilot port of the counterbalance valve.

At block 706, the method 700 includes receiving an input pilot fluid signal at the third port 114 of the valve 100.

At block 708, the method 700 includes, responsively, operating the valve 100 in a counterbalance valve mode of operation, wherein fluid received at the first port 110 from the chamber of the actuator flows through the valve 100 to the second port 112 of the valve 100, which is fluidly coupled to the reservoir.

The detailed description above describes various features and operations of the disclosed systems with reference to the accompanying figures. The illustrative implementations described herein are not meant to be limiting. Certain aspects of the disclosed systems can be arranged and combined in a wide variety of different configurations, all of which are contemplated herein.

Further, unless context suggests otherwise, the features illustrated in each of the figures may be used in combination with one another. Thus, the figures should be generally viewed as component aspects of one or more overall implementations, with the understanding that not all illustrated features are necessary for each implementation.

Additionally, any enumeration of elements, blocks, or steps in this specification or the claims is for purposes of clarity. Thus, such enumeration should not be interpreted to require or imply that these elements, blocks, or steps adhere to a particular arrangement or are carried out in a particular order.

Further, devices or systems may be used or configured to perform functions presented in the figures. In some instances, components of the devices and/or systems may be configured to perform the functions such that the components are actually configured and structured (with hardware and/or software) to enable such performance. In other examples, components of the devices and/or systems may be arranged to be adapted to, capable of, or suited for performing the functions, such as when operated in a specific manner.

By the term "substantially" or "about" it is meant that the recited characteristic, parameter, or value need not be achieved exactly, but that deviations or variations, including for example, tolerances, measurement error, measurement accuracy limitations and other factors known to skill in the art, may occur in amounts that do not preclude the effect the characteristic was intended to provide The arrangements described herein are for purposes of example only. As such, those skilled in the art will appreciate that other arrangements and other elements (e.g., machines, interfaces, operations, orders, and groupings of operations, etc.) can be used instead, and some elements may be omitted altogether according to the desired results. Further, many of the elements that are described are functional entities that may be implemented as discrete or distributed components or in conjunction with other components, in any suitable combination and location.

While various aspects and implementations have been disclosed herein, other aspects and implementations will be apparent to those skilled in the art. The various aspects and implementations disclosed herein are for purposes of illustration and are not intended to be limiting, with the true scope being indicated by the following claims, along with the full scope of equivalents to which such claims are entitled. Also, the terminology used herein is for the purpose of describing particular implementations only, and is not intended to be limiting.

What is claimed is:

1. A valve comprising:
a plurality of ports comprising: (i) a first port configured to be fluidly coupled to a hydraulic actuator, (ii) a second port configured to be fluidly coupled to a reservoir, (iii) a third port configured to provide an output pilot fluid signal and receive an input pilot fluid signal, and (iv) a fourth port configured to be fluidly coupled to a source of fluid;
a pilot poppet configured to be subjected to a first fluid force of fluid received at the first port acting on the pilot poppet in a proximal direction;
a pilot piston interfacing with the pilot poppet and configured to be subjected to a second fluid force of the input pilot fluid signal acting on the pilot piston in the proximal direction;
a solenoid actuator sleeve that is axially movable between an unactuated state and an actuated state; and
at least one setting spring configured to apply a biasing force on the pilot piston and the pilot poppet in a distal direction to seat the pilot poppet at a pilot poppet seat, wherein the valve is configured to operate in at least two modes of operation: (i) a counterbalance valve mode of operation in which the first fluid force and the second fluid force cooperate to overcome the biasing force of the at least one setting spring, thereby unseating the pilot poppet and fluidly coupling the first port to the second port, and (ii) a proportional flow control mode of operation in which the solenoid actuator sleeve moves to the actuated state, thereby allowing the fourth port to be fluidly coupled to: (a) the first port to provide fluid flow thereto, and (b) the third port to provide the output pilot fluid signal to be communicated externally.

2. The valve of claim 1, further comprising:
a main sleeve comprising the first port, the second port, and pilot poppet seat; and
a housing having a cylindrical cavity in which the main sleeve is at least partially disposed, wherein the housing comprises the third port and the fourth port.

3. The valve of claim 2, further comprising:
a main flow piston configured to be seated at a main piston seat formed in the main sleeve to block fluid flow between the fourth port and the first port when the valve operates in the counterbalance valve mode of operation; and
a main flow check spring configured to bias the main flow piston toward the main piston seat, wherein when the valve operates in the proportional flow control mode of operation, fluid flows from the fourth port through a longitudinal channel formed in the main sleeve and applies a respective fluid force on the main flow piston against the main flow check spring, thereby unseating the main flow piston off the main piston seat, and opening a fluid path from the fourth port to the first port.

4. The valve of claim 1, wherein the solenoid actuator sleeve comprises a chamber therein, wherein the at least one setting spring is disposed in the chamber within the solenoid actuator sleeve.

5. The valve of claim 1, wherein the at least one setting spring comprises: (i) a first setting spring, and (ii) a second setting spring, wherein the first setting spring and the second setting spring are disposed in parallel with respect to the pilot piston in a nested spring configuration.

6. The valve of claim 5, further comprising:
a first spring cap, wherein respective distal ends of the first and second setting springs contact the first spring cap, such that the first and second setting springs apply the biasing force on the pilot piston via the first spring cap; and
a second spring cap, wherein respective proximal ends of the first and second setting springs contact the second spring cap.

7. The valve of claim 6, further comprising:
a manual adjustment actuator having: (i) an adjustment piston, (ii) a pin having a proximal end interfacing with the adjustment piston and a distal end interfacing with the second spring cap, such that axial motion of the adjustment piston causes the pin and the second spring cap coupled thereto to move axially, thereby adjusting the biasing force of the first and second setting springs on the pilot piston.

8. The valve of claim 1, further comprising:
a solenoid coil;
a pole piece; and an armature that is mechanically coupled to the solenoid actuator sleeve, such that when the solenoid coil is energized, a solenoid force is applied to the armature and the solenoid actuator sleeve coupled thereto, thereby (i) causing the armature and the solenoid actuator sleeve to move axially in the proximal direction toward the pole piece, and (ii) placing in the solenoid actuator sleeve in the actuated state.

9. The valve of claim 8, further comprising:
a main spring configured to bias the solenoid actuator sleeve to the unactuated state, wherein the solenoid force causes the solenoid actuator sleeve to move against a respective biasing force of the main spring until the respective biasing force balances the solenoid force.

10. The valve of claim 8, wherein the fourth port comprises one or more inlet flow cross-holes, wherein the solenoid actuator sleeve is configured to (i) block the one or more inlet flow cross-holes when the solenoid actuator sleeve is in the unactuated state, and (ii) allow the one or more inlet flow cross-holes to be fluidly coupled to the first port when the solenoid actuator sleeve is in the actuated state.

11. The valve of claim 8, further comprising:
a solenoid tube comprising: (i) a cylindrical body, (ii) a first chamber defined within the cylindrical body and configured to receive the armature therein, and (iii) a second chamber defined within the cylindrical body, wherein the pole piece is formed as a protrusion within the cylindrical body, wherein the pole piece is disposed between the first chamber and the second chamber, and wherein the pole piece defines a channel therethrough, such that the channel of the pole piece fluidly couples the first chamber to the second chamber.

12. The valve of claim 1, wherein the third port comprises: (i) a first pilot signal cross-hole configured to receive the input pilot fluid signal when the valve operates in the counterbalance valve mode of operation, and (ii) a second pilot signal cross-hole configured to provide the output pilot fluid signal when the valve operates in the proportional flow control mode of operation.

13. The valve of claim 12, further comprising:
a check ball configured to allow the output pilot fluid signal to be communicated via the second pilot signal cross-hole when the valve operates in the proportional flow control mode of operation, while blocking the input pilot fluid signal at the second pilot signal cross-hole when the valve operates in the counterbalance valve mode of operation.

14. A hydraulic system comprising:
a source of fluid;
a reservoir;
an actuator having a first chamber and a second chamber therein;
a counterbalance valve comprising: (i) a load port fluidly coupled to the second chamber of the actuator, and (ii) a pilot port, wherein the counterbalance valve is configured to allow fluid flow from the load port to the reservoir when a pilot fluid signal is received at the pilot port; and
a valve comprising: (i) a first port fluidly coupled to the first chamber of the actuator, (ii) a second port fluidly coupled to the reservoir, (iii) a third port configured to provide an output pilot fluid signal to the pilot port of the counterbalance valve and receive an input pilot fluid signal, and (iv) a fourth port fluidly coupled to the source of fluid, and wherein the valve further comprises:
a pilot poppet configured to be subjected to a first fluid force of fluid received at the first port acting on the pilot poppet in a proximal direction,
a pilot piston interfacing with the pilot poppet and configured to be subjected to a second fluid force of the input pilot fluid signal acting on the pilot piston in the proximal direction,
a solenoid actuator sleeve that is axially movable between an unactuated state and an actuated state, and
at least one setting spring configured to apply a biasing force on the pilot piston and the pilot poppet in a distal direction to seat the pilot poppet at a pilot poppet seat, wherein the valve is configured to operate in at least two modes of operation: (i) a counterbalance valve mode of operation in which the first fluid force and the second fluid force cooperate to overcome the biasing force of the at least one setting spring, thereby unseating the pilot poppet and fluidly coupling the first port to the second port, and (ii) a proportional flow control mode of operation in which the solenoid actuator sleeve moves to the actuated state, thereby allowing the fourth port to be fluidly coupled to: (a) the first port to provide fluid flow to the first chamber of the actuator, and (b) the third port to provide the output pilot fluid signal to be communicated to the pilot port of the counterbalance valve to actuate the counterbalance valve and allow fluid to flow from the second chamber to the reservoir.

15. The hydraulic system of claim 14, wherein the valve further comprises:
a main sleeve comprising the first port, the second port, and pilot poppet seat; and
a housing having a cylindrical cavity in which the main sleeve is at least partially disposed, wherein the housing comprises the third port and the fourth port.

16. The hydraulic system of claim 15, wherein the valve further comprises:
a main flow piston configured to be seated at a main piston seat formed in the main sleeve to block fluid flow between the fourth port to the first port when the valve operates in the counterbalance valve mode of operation; and
a main flow check spring configured to bias the main flow piston toward the main piston seat, wherein when the valve operates in the proportional flow control mode of operation, fluid flows from the fourth port through a longitudinal channel formed in the main sleeve and applies a respective fluid force on the main flow piston against the main flow check spring, thereby unseating the main flow piston off the main piston seat, and opening a fluid path from the fourth port to the first port.

17. The hydraulic system of claim 14, wherein the valve further comprises:
a solenoid coil, a pole piece, and an armature that is mechanically coupled to the solenoid actuator sleeve, such that when the solenoid coil is energized, a solenoid force is applied to the armature and the solenoid actuator sleeve coupled thereto, thereby (i) causing the armature and the solenoid actuator sleeve to move axially in the proximal direction toward the pole piece, and (ii) placing in the solenoid actuator sleeve in the actuated state; and a main spring configured to bias the solenoid actuator sleeve to the unactuated state, wherein the solenoid force causes the solenoid actuator sleeve to move against a respective biasing force of the main spring until the respective biasing force balances the solenoid force, wherein the fourth port comprises one or more inlet flow cross-holes, wherein the solenoid actuator sleeve is configured to (i) block the one or more inlet flow cross-holes when the solenoid actuator sleeve is in the unactuated state, and (ii) allow the one or more inlet flow cross-holes to be fluidly coupled to the first port when the solenoid actuator sleeve is in the actuated state.

18. The hydraulic system of claim 14, wherein the third port of the valve comprises: (i) a first pilot signal cross-hole configured to receive the input pilot fluid signal when the valve operates in the counterbalance valve mode of operation, and (ii) a second pilot signal cross-hole configured to provide the output pilot fluid signal to the pilot port of the counterbalance valve when the valve operates in the proportional flow control mode of operation, wherein the valve further comprises:

a check ball configured to allow the output pilot fluid signal to be communicated via the second pilot signal cross-hole when the valve operates in the proportional flow control mode of operation, while blocking the input pilot fluid signal at the second pilot signal cross-hole when the valve operates in the counterbalance valve mode of operation.

19. A method comprising:

receiving an electrical command signal energizing a solenoid coil of a valve, wherein the valve comprises: (i) a first port fluidly coupled to a chamber of an actuator, (ii) a second port fluidly coupled to a reservoir, (iii) a third port fluidly coupled to a pilot port of a counterbalance valve, and (iv) a fourth port fluidly coupled to a source of fluid;

responsively, operating the valve as a meter-in valve that: (i) meters fluid received at the fourth port and provides metered fluid to the first port to be provided to the chamber of the actuator, and (ii) provides an output pilot fluid signal through the third port of the valve to the pilot port of the counterbalance valve;

receiving an input pilot fluid signal at the third port of the valve; and responsively, operating the valve as in a counterbalance valve mode of operation, wherein fluid received at the first port from the chamber of the actuator flows through the valve to the second port of the valve, which is fluidly coupled to the reservoir.

20. The method of claim 19, wherein the valve further comprises: a pole piece, an armature that is mechanically coupled to a solenoid actuator sleeve, a main spring configured to bias the solenoid actuator sleeve to an unactuated state, wherein operating the valve as the meter-in valve comprises:

applying a solenoid force on the armature and the solenoid actuator sleeve coupled thereto, thereby (i) causing the armature and the solenoid actuator sleeve to move toward the pole piece against a respective biasing force of the main spring until the respective biasing force balances the solenoid force, and (ii) placing in the solenoid actuator sleeve in an actuated state, wherein the fourth port comprises one or more inlet flow cross-holes, wherein the solenoid actuator sleeve is configured to (i) block the one or more inlet flow cross-holes when the solenoid actuator sleeve is in the unactuated state, and (ii) allow the one or more inlet flow cross-holes to be fluidly coupled to the first port when the solenoid actuator sleeve is in the actuated state.

* * * * *